United States Patent
Arikawa et al.

(10) Patent No.: US 6,185,161 B1
(45) Date of Patent: Feb. 6, 2001

(54) DISPLAY DEVICE AND ELECTRONIC TIMEPIECE

(75) Inventors: Yasuo Arikawa, Chino; Eiichi Miyazawa; Satoshi Chiba, both of Suwa, all of (JP)

(73) Assignee: Seiko Epson Corporation, Tokyo (JP)

( * ) Notice: Under 35 U.S.C. 154(b), the term of this patent shall be extended for 0 days.

(21) Appl. No.: 09/090,987

(22) Filed: Jun. 5, 1998

(30) Foreign Application Priority Data

| Jun. 9, 1997 | (JP) | 9-150954 |
| Jul. 9, 1997 | (JP) | 9-184124 |
| May 19, 1998 | (JP) | 10-137013 |

(51) Int. Cl.[7] ............. G04C 19/00; G04C 17/00; G02F 1/1335
(52) U.S. Cl. ............. 368/84; 368/242; 349/96; 349/106; 349/114
(58) Field of Search ............. 368/82–84, 239–242; 349/32, 74, 90, 96, 106, 110, 112, 114, 117, 165, 100

(56) References Cited

U.S. PATENT DOCUMENTS 4,239,349 * 12/1980 Scheffer ............. 350/347 R

FOREIGN PATENT DOCUMENTS

| 2 276 751 | 10/1994 | (GB) . |
| 55-146091 | * 11/1980 | (JP) . |
| 5-273548 | 1/1994 | (JP) . |
| WO 95/17692 | 6/1995 | (WO) . |
| WO 97/01788 | 1/1997 | (WO) . |

OTHER PUBLICATIONS

M.F. Weber, "Retroreflecting Sheet Polarizer, " SID 92 Digest, pp. 427–429.

* cited by examiner

Primary Examiner—Vit Miska
(74) Attorney, Agent, or Firm—Oliff & Berridge, PLC

(57) ABSTRACT

A display device and an electronic timepiece displays information, such as numerical information, and the background has a glossy silver metallic tone, to give the display a quality appearance. The display device and the electronic timepiece includes a polarizer, a liquid crystal panel, and a polarization separating film. The polarization separating film transmits linearly polarized light oriented in a certain direction and reflects all other linearly polarized light. The surface of the polarization separating film which opposes the liquid crystal panel, is formed into a smooth surface which specularly reflects light, and a light-scattering layer is not provided therebetween. Light, reflected from the polarization separating film, is used to produce a glossy silver background color or information display with a metallic tone in order to give the display a quality appearance.

25 Claims, 13 Drawing Sheets

DISPLAY DEVICE AND ELECTRONIC TIMEPIECE

BACKGROUND OF THE INVENTION

1. Field of Invention

The present invention relates to a display device for displaying characters, numbers, patterns, or the like. The present invention also relates to an electronic timepiece, such as a wristwatch or a stopwatch, for giving or measuring time.

2. Description of Related Art

Conventionally, there are widely known display devices which utilize flat displays, such as liquid crystal displays, for displaying numbers, characters, or other information. For example, as shown in FIG. 9, in an electronic timepiece utilizing a liquid crystal display, a pair of polarizers 52 and 53 are placed on both sides of a liquid crystal panel 51, and a light-emitting element 54 is disposed at the back side of the polarizer 53. The pair of polarizers 52 and 53 are disposed such that, for example, their azimuthal angles are set to form a right angle.

During daytime, conventional electronic timepieces display numerical information or the like using external light, whereas during the night they display numerical information or the like using light emitted from the light-emitting element 54, when necessary. Numerical information or the like is displayed by applying a predetermined voltage between the electrodes of the liquid crystal panel 51, with the area to which voltage is not applied appearing as a white background or the like. In the figure, the area to which a voltage is applied to display information is represented as ON, whereas the background color area to which a voltage is not applied is represented as OFF.

As indicated by arrow P, when external light is used to produce background color of a display (liquid crystal panel is turned off), the linearly polarized light component of the external light or natural light, which is oriented parallel to the plane of the figure, passes through the polarizer 52. Then, the polarization direction thereof is twisted 90 degrees by the liquid crystal panel 51 in an off state, causing the linearly polarized light to be oriented perpendicular to the plane of the figure. The linearly polarized light, which has passed through the polarizer 53, is irregularly reflected by a surface of the light-emitting element 54, and part of the irregularly reflected light is transmitted successively back through the polarizer 53, the liquid crystal panel 51, and the polarizer 52 to produce a white background which is perceived by any viewer.

As indicated by arrow Q, when numerical information or the like is to be displayed using external light (the liquid crystal panel 51 is turned on), linearly polarized light, which is oriented parallel to the plane of the figure, is separated from the external light by the polarizer 52, and passes through the liquid crystal panel 51. Since the liquid crystal panel 51 is in an on state, the polarization direction of the linearly polarized light is maintained parallel to the plane of the figure, so that it is absorbed by the polarizer 53. The portion that has absorbed the light appears black to any viewer.

As can be understood from the foregoing description, when external light is used, numbers or the like are displayed on a background having a color corresponding to that reflected from the light-emitting element 54 in order to display the time or other information.

On the other hand, as indicated by arrow C, when a background color is to be produced using light emitted from the light-emitting element 54 (the liquid crystal panel 51 is turned off), the linearly polarized light which is oriented perpendicular to the plane of the figure is separated from randomly polarized light emitted from the light-emitting element 54 by the polarizer 53. Since the liquid crystal panel 51 is in an off state, the polarization direction of the linearly polarized light is twisted 90 degrees by the liquid crystal panel 51, causing the linearly polarized light to be oriented parallel to the plane of the figure. Then, the polarized light passes through the polarizer 52 and is perceived by an outside viewer. The perceived color is the color emitted from the light emitting element 54, which is ordinarily white.

As indicated by arrow D, when numerical information or the like is to be displayed using light emitted from the light emitting element 54 (the liquid crystal panel 51 is turned on), the linearly polarized light, which is oriented perpendicular to the plane of the figure is separated from the light emitted from the light emitting element 54 by the polarizer 53, passes through the liquid crystal panel 51 in an on state, and reaches the polarizer 52. Here, the polarization direction of the linearly polarized light does not match the polarization direction of the polarizer 52, so that the linearly polarized light is absorbed by the polarizer 52. The portion of the polarizer which has absorbed the light, appears black to any viewer.

As can be understood from the foregoing description, when light from the light-emitting element 54 is used, numbers or the like are displayed in black or the like on a background having a color corresponding to the color emitted from the light emitting element 54.

In the above-described conventional electronic timepiece, two polarizers 52 and 53 are disposed on both sides of the liquid crystal panel 51. These polarizers are capable of absorbing linearly polarized light other than that having a predetermined polarization direction. Therefore, the intensity of the light, emitted to the outside for producing a background color or displaying numerical information or the like, may be greatly reduced, causing numerical information or the like to appear dark, and thus difficult to read.

Theoretically speaking, various background colors can be produced, or numerical information or the like can be displayed in various colors by providing a color filter, producing the right color, at a surface of the light-emitting element 54. Actually, however, various display colors cannot be produced, since the light intensity is greatly reduced, so that either a bright, white color or gray had to be used for the display.

SUMMARY OF THE INVENTION

In view of the above-described problems, it is an object of the present invention to display numerical information, or the like, and the background, to have a glossy silver metallic tone in order to give a quality appearance to the display.

To achieve the above object, the display device of the present invention may include a first polarization separator that transmits therethrough linearly polarized light polarized in a first direction and that does not transmit therethrough linearly polarized light polarized in a direction perpendicular to the first direction, a polarization changing element, disposed at a position to receive the linearly polarized light from the first polarization separator, that selects between a state in which a polarization direction of light passing therethrough is changed and a state in which the polarization direction is not changed, and a second polarization separator, diametrically opposed to the first polarization separator with the polarization changing element interposed therebetween, that transmits linearly polarized light polarized in the first direction and reflects linearly polarized light polarized in a direction perpendicular to the first direction, the surface of the second polarization separator facing the polarization changing element being a smooth surface that reflects light in specular reflection.

The electronic watch of the present invention may comprise a first polarization separator that transmits therethrough linearly polarized light polarized in a first direction and that does not transmit therethrough linearly polarized light polarized in a direction perpendicular to the first direction, a polarization changing element, disposed at a position to receive the linearly polarized light from the first polarization separator, for selecting between a state in which a polarization direction of light passing therethrough is changed and a state in which the polarization direction is not changed, a second polarization separator, diametrically opposed to the first polarization separator with the polarization changing element interposed therebetween, that transmits linearly polarized light polarized in a first direction, and that reflects linearly polarized light polarized in a direction perpendicular to the first direction, and a light emitting element arranged on the side of the second polarization separator opposite to the polarization changing element.

In the above arrangements, the first polarization separator is constructed of an ordinary polarizer. The ordinary polarizer may be a film member which outputs linearly polarized light polarized in one direction in response to an incident natural light, and may be produced by interposing a polarizer layer between protective layers of TAC (cellulose triacetate).

The polarization changing element may be constructed of a liquid crystal element, for example. Liquid crystals may be any of variety of liquid crystals including a TN (Twisted Nematic) liquid crystal, an STN (Super-Twisted Nematic) liquid crystal, and an ECB (Electrically Controlled Birefringence) liquid crystal. The STN liquid crystals employs color compensation, optically anisotropic material, such as an F-STN (Film Compensated Super-Nematic) liquid crystal.

The second polarization separator may be one of (1) the polarization separating film of a multi-layered structure of films as disclosed in International Publication Nos. WO95/17692 and WO95/27919, (2) a polarization separator having a cholesteric liquid crystal with a λ/4 phase plate on one side or on both sides, (3) a polarization separator that separates a light into a reflected polarized light and a transmitted polarized light taking advantage of the Brewster's angle (SID 92 DIGEST, pages 427 to 429) and (4) a polarization separator employing the hologram.

The display device and electronic watch of this invention may use the second polarization separator instead of a polarizer arranged behind the polarization changing element in the conventional electronic watch and by the smooth surface of the second polarization separator facing the polarization changing element to reflect light in a specular reflection.

The polarizer generally has the function of transmitting linearly polarized light polarized in a first direction while not transmitting other light by absorption, and in contrast, the second polarization separator transmits linearly polarized light polarized in the first direction while reflecting a light perpendicular to it, particularly, totally reflecting (in specular reflection) the linearly polarized light polarized in a direction perpendicular to the first polarization direction.

With the second polarization separator substituted for the ordinary polarizer, light, which would be conventionally absorbed or dispersed, is reflected contributing to the displaying and brightening the background color and numeric information and the like in the electronic watch. When the second polarization separator is provided with the smooth surface to reflect light in specular reflection without arranging a light scattering layer, namely, a light diffusion layer on the front side (viewing side) of the second polarization separator, the light reflected in specular reflection gives a sufficient amount of light to the viewer without attenuation. When a light scattering layer (light diffusion layer) is arranged on the front side of the second polarization separator, the light specularly reflected by the second polarization separator is scattered, becoming soft but at a sufficient level to the viewer.

The specularly reflected light from the second polarization separator is presented either as the background color or as the color for the numeric information and the like depending on the setting of the polarization direction of the first polarization separator, and in either case, the display device and watch present a glossy, silver-metallic color, high-quality display. In an ordinary electronic watch, the information display area for numeric information and the like is relatively small in area compared to the background color area, and the high-quality display is even more enhanced with the background color presented by the specularly reflected light.

The electronic watch of the present invention may comprise a lamination of a first polarizer which transmits linearly polarized light polarized in a first direction while not transmitting linearly polarized light polarized in a second direction perpendicular to said first direction, a twisted nematic liquid crystal layer which rotates a polarization direction of light transmitted therethrough in an off state while not rotating the polarization direction in an on state, a second polarizer which transmits linearly polarized light polarized in a third direction while reflecting, in specular reflection, linearly polarized light polarized in a fourth direction perpendicular to said third direction, a first optical element, a reflective layer, and a light emitting element laminated in the above order.

With this arrangement, the electronic watch incorporating a bright second polarizer for specular reflection becomes a compact and low power-consumption watch.

In the electronic watch, the reflective layer irregularly reflects light traveling from the second polarizer to the light emitting element. With this arrangement, the irregular reflection on the reflective layer makes the external light opaque white, presenting a bright white background or a bright segment color.

In the electronic watch, the first optical element may be a light absorbing layer. With this arrangement, when the external light is used, the polarized light transmitted through the second polarization separator, out of the external light, is absorbed by the light absorbing layer, and the polarized light transmitted through the second polarization separator is irregularly reflected by the reflective layer, and is farther absorbed by the light absorbing layer, light attenuation increases, and light that is again transmitted through the second polarization separator is substantially reduced, thereby keeping a black color. When the light emitting element is used, the light from it is transmitted through the light absorbing layer once, and travels to the second polarization separator, and thereby suffers less attenuation. The emission color itself is seen from the outside.

In the electronic watch, the first optical element may be a coloration layer. With this arrangement, when the external light is used, the polarized light transmitted through the second polarization separator (the second polarizer) is transmitted through the coloration layer, the reflective layer and the coloration layer and then the second polarization separator again and exits externally. For this reason, the color of the polarized light reflected from the second polarization separator (a silver-mirror color when no second optical element is arranged between the TN liquid crystal layer and the second polarization separator, and a white color when a second optical element such as a diffusion layer is arranged between the TN liquid crystal layer and the second polarization separator) contrasts with the color of the polarized light transmitted through the second polarization separator, improving the contrast of the display.

Available as the coloration layer is an orange filter, a green filter or the like, and the color of the polarized light transmitted through the second polarization separator is orange when an orange filter is used, and green when a green filter is used.

In this case, the emission color of the light emitting element is light green when an EL element is used, and is red, green or the like when an LED is used, and a great difference is caused between the emission color (with the light emitting element on) resulting from the light emitting element in the same liquid crystal layer (in on or off) and the color from the external light (the light emitting element off), drawing the viewer's attention.

In the electronic watch, a second optical element may be arranged between the twisted nematic liquid crystal layer and the second polarizer. In the electronic watch, the second optical element may be either a light diffusion layer or a light scattering layer.

In the electronic watch, a second optical element may be arranged between the twisted nematic liquid crystal layer and the second polarizer.

In these arrangements, when the external light is used, the polarized light may be specularly reflected from the second polarization separator, out of the external light, diffused or scattered, and looks white to the user, and an easy-to-see electronic watch results with a bright and soft color tone but not loud such as silver.

In the electronic watch, the light absorbing layer may be a tracing paper. The light absorbing layer is easily formed using a commercially available tracing paper.

In the electronic watch, the light absorbing layer may have a visible light transmittance within a range from 40% to 80%. More preferably, the light absorbing layer may have a visible light transmittance within a range from 55% to 65%.

With the arrangement in the electronic watch, the external light transmitted through the second polarization separator may be balanced with the emission of the light emitting element transmitted through the second polarization separator, and an easy-to-see electronic watch results.

The electronic watch may have means arranged between the coloration layer and the reflective layer to transmit light from the light emitting element while irregularly reflecting light from the coloration layer. With this arrangement, a copy paper sheet is preferred as the means. Especially when an LED device as the light emitting element is used as a side light, a slant guide plate is used to guide the emission of the LED and to reflect it toward the TN liquid crystal, the light from the LED is made uniform and transmitted, and the light from the coloration layer is irregularly reflected.

In the electronic watch, the light emitting element may comprise an electroluminescence device or a light emitting diode.

The light emitting element may employ a surface emitting type EL element. A compact electronic watch is thus provided. The electronic watch features a low power consumption with the surface emitting LED device or a side light LED device.

By introducing a color difference between the color of the light transmitted through the second polarization separator and the external light reflected from the second polarization separator, the viewer's attention to the electronic watch is easily called.

Since the color of the segment is the emission color of the light emitting element, a bright display results.

In the electronic watch, a light-transmissive color layer may be arranged between the polarization changing element and the light emitting element. With the color layer arranged between the polarization changing element and the second polarization separator, a glossy metallic color not only of silver but also of other various colors is introduced. Particularly, with a golden layer as the color layer arranged, a golden metallic tone is introduced contributing to a high-quality display.

To form a color layer, a color film of an appropriate color may be glued onto, or a metal powder or other color powder may be sprayed at a density level still assuring a light transmissivity onto, at least one of the surface of the second polarization separator facing the polarization changing element and the surface of the polarization changing element facing the second polarization separator.

In the electronic watch, the light emitting element may comprise an electroluminescence element or a light emitting diode, and may emit light of at least one of orange, red, light green, and green to the twisted nematic liquid crystal layer via the second polarizer.

The electronic watch of the present invention may comprise a lamination of a first polarizer which transmits light polarized in a direction parallel to a first polarization direction while absorbing light polarized in a direction perpendicular to the first polarization direction, a liquid crystal layer which rotates the polarization direction of an incident light by 90 degrees in a non-voltage applied state while not rotating the polarization direction of the incident light in a voltage-applied state, a polarization separator which transmits light polarized in a second polarization direction while reflecting light polarized in a direction perpendicular to the second polarization direction, a first optical element, a reflective element that irregularly reflects light, and a light emitting element that emits an emission color light, laminated in the above order, wherein when the first polarization direction is parallel to the second polarization direction, a first color light from the external light in the non-voltage applied state has the color of the light reflected from the polarization separator while a second color light from the external light in the voltage-applied state has the color of the light transmitted through the first optical element. When the first polarization direction is parallel to the second polarization direction, a third color light from the emission of the light emitting element in the non-voltage applied state is black while a fourth color light from the emission of the light emitting element in the voltage-applied state has the color of the light transmitted through the first optical element. When the first polarization direction is perpendicular to the second polarization direction, a fifth color light from the external light in the non-voltage applied state has the color of the light transmitted through the first optical element while a sixth color light from the external light in the voltage-applied state has the color of the light reflected from the polarization separator. When the first polarization direction is perpendicular to the second polarization direction, a seventh color light from the emission of the light emitting element in the non-voltage applied state has the color of the light transmitted through the first optical element while an eighth color light from the emission of the light emitting element in the voltage applied state is black.

In the electronic watch, a light scattering layer or a light diffusion layer may be arranged between the liquid crystal layer and the polarization separator and both the first color light and the sixth color light are white.

In the electronic watch, the first optical element may be a light absorbing layer, both the second color light and the fifth color light are black, and both the fourth color light and the seventh color light have the emission color.

In the electronic watch, the first optical element may be a coloration layer, both the second color light and the fifth color light are the color attributed to the coloration layer, and both the fourth color light and the seventh color light have the emission color that is colored through the transmission through the coloration layer.

When a coloration layer as the first optical element is provided with a backlight on, the light exiting outwardly is an emitted light colored through the coloration layer. If the EL element is used in this case, the emission color of the EL element is a light color and a resulting color looks like a mixed color of the emission color and the color of the coloration layer because the wavelength characteristics of the EL element is mild. On the other hand, the wavelength characteristics of the LED are sharp, and the emission of the LED is not efficiently transmitted through the coloration layer if it fails to match the coloration layer. The coloration layer for the LED is preferably a band pass filter having wavelength characteristics.

In addition to the aforementioned structural elements:

(1) It is desirable that a light-scattering layer be provided opposite the polarization changing element with the second polarized light separator interposed therebetween, that is at the back side of the second polarization separator with respect to the viewer. With the light-scattering layer provided, when the background color is a glossy metallic color, numerical information or the like can be displayed in a non-glossy color that stands out, whereas when numerical information or the like is displayed in a glossy color, a non-glossy background color can be produced to make the numerical information, or the like, stand out.

(2) In addition to the aforementioned structural elements, a light-emitting element that emits light to the polarization changing element through the second polarization separator may be provided. The light-emitting element which may be used includes: 1) a planar light-emitting element like an electroluminescence (EL) element; 2) a light-emitting device in which a cold cathode, being a linear light source, is disposed at a side end face of a light guide plate having a planar light-emitting surface; and 3) a light emitting device or the like in which a plurality of light emitting diodes (LEDs), being point-like light sources, are disposed in a row at a side end face of a light guide plate having a planar light emitting surface.

When a light-emitting element is used as an additional structural element, the viewer can freely select a display method, that is the display method using external natural light or that using a light-emitting element. In addition, when the second polarization separator, which transmits a linearly polarized light polarized in a certain direction and reflects all other linearly polarized light, is used, instead of an ordinary polarizer, numerical information or the like can be displayed in various forms, and various background colors can be produced, compared to conventional electronic timepieces in which two polarizers are used for displaying information or producing a background color.

For example, in conventional devices, when the display method is switched between that using external natural light and that using the light emitting element, there is not much difference between the background colors and the forms of display of such information as numerical information. For example, when numerical information or the like is displayed in a dark color, such as black, on a background with a color corresponding to the reflected color or the emitted color of the light emitting element, and the display method is switched, only the way in which the background color is produced by the light emitting element is changed, so that the background color is either produced by the reflected color or the emitted color of the light emitting element, ordinarily causing the background color to be the same in both cases. Similarly, when numerical information or the like is displayed in a color corresponding to the reflected color or emitted color of the light emitting element on a background with a dark color, such as black, only the way in which the color of the numerical information or the like is produced by the light emitting element is changed, so that the color of the numerical information or the like is produced either by the reflected color or the emitted color of the light emitting element.

Compared to the above-described conventional devices, the electronic timepiece of the present invention comprising a light emitting element is constructed in such a way as to allow the background color and the form of display of the numerical information or the like to be changed drastically, when the display method switches between that using external natural light and that using the light emitting element. This change may surprise the viewer.

For example, when the display method is switched from that using external natural light to that using the light emitting element, the numerical information or the like displayed in a bright color on a background with a glossy metallic tone that gives quality appearance to the display, is displayed in a bright color produced by the light emitting element on a background having a dark color, such as black. Such a change can surprise the viewer.

(3) It is desirable to construct the light emitting element so that it emits at least one of the following colors: orange, red, or yellowish green. In the electronic timepiece of the present invention, numerical information or the like is displayed in the color emitted by the light emitting element. Since the aforementioned colors stand out against black, when the light emitting element is made to emit any one of the aforementioned colors to display numerical information or the like in any one of these colors, the displayed information becomes bright and easy to read, thereby easily attracting the human eye.

(4) In the foregoing description, nothing was particularly stated about whether the light emitting element is to emit a single color or a plurality of colors. When the light emitting element is constructed to emit a plurality of colors, numerical information or the like can be displayed in several colors in one electronic timepiece, so that displays of a greater variety of colors can be realized.

(5) When the aforementioned light emitting element is used to emit a plurality of colors, the color emitted by the light emitting source itself may be changed, and the light emitting element may be composed of a white light emitting source and a color filter.

(6) As mentioned above, various polarization separating elements can be used for the second polarization separating element, but it is desirable that a polarization separating film, disclosed in International Patent Publication Nos. WO95/17692 or WO95/27919, be used for the second polarization separator.

DETAILED DESCRIPTION OF PREFERRED EMBODIMENTS

Figure 4:
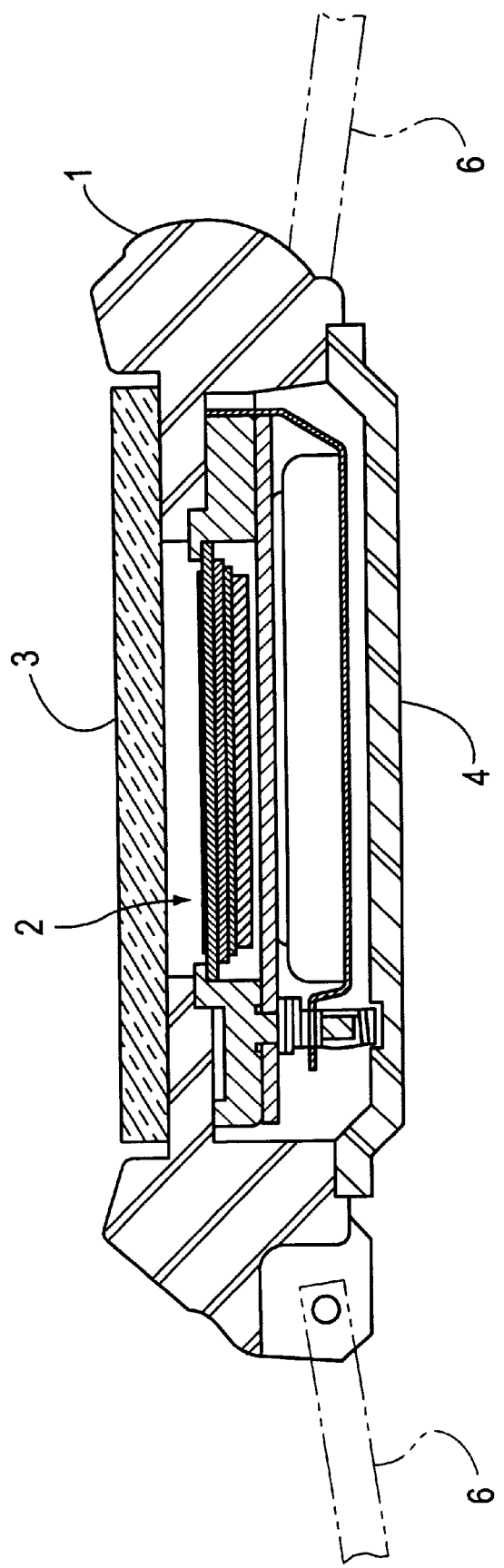
FIG. 4 is a sectional view of the structure of an electronic wristwatch used as an embodiment of the timepiece in accordance with the present invention.

FIG. 4 is a sectional view of the structure of an embodiment of a electronic wristwatch used to describe the display device in accordance with the present invention. The wristwatch comprises, for example, a plastic case 1, an assembly 2 contained in the case 1, a glass cover 3 affixed to the case 1 and disposed above the assembly 2, and a back cover 4 affixed to the assembly 2. Reference numeral 6 denotes a wristband.

Figure 6:
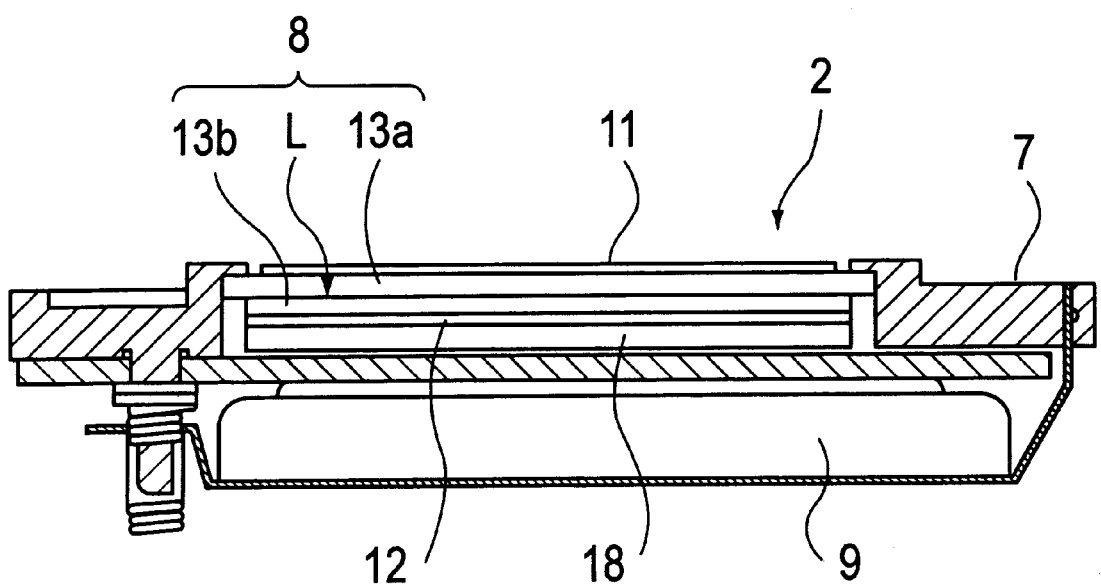
FIG. 6 is a sectional view of the movement of FIG. 5.

As shown in FIG. 6, the assembly 2 includes a panel frame 7; a liquid crystal element 8, serving as a polarization changing element, supported by the panel frame 7, a polarizer 11, serving as a first polarization separator, affixed to the outside surface (upper surface in the figure) of the liquid crystal element 8, a polarization separating film 12, serving as a second polarization separator, disposed opposite the polarizer 11 with the liquid crystal element 8 interposed therebetween, a backlight 18, serving as a light-emitting element, disposed at the bottom surface side of the polarization separating film 12, and a battery 9.

Figure 2:
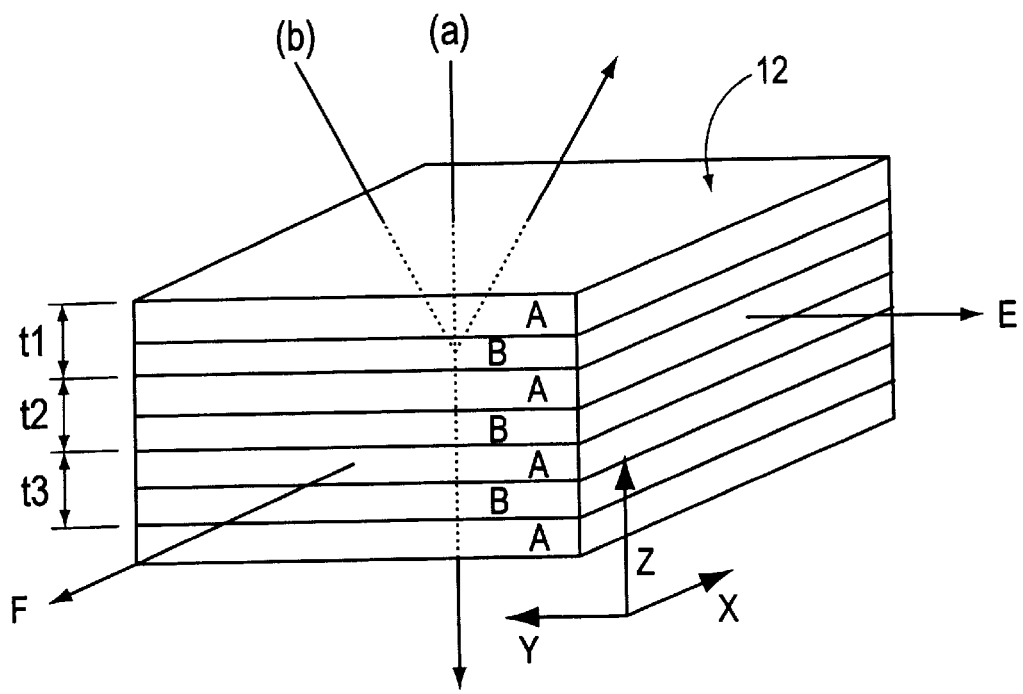
FIG. 2 is a perspective view schematically showing the internal structure of the polarization separating film used as the main portion of the structure shown in FIG. 1.

The polarizer 11 is an ordinary polarizer that transmits only linearly polarized light polarized in a certain direction, while not transmitting other linearly polarized light by absorption, scattering, or the like. As shown in FIG. 2, the polarization separating film 12 is a laminated structure of a plurality of thin films. As mentioned above, the polarization separating film 12 transmits only linearly polarized light polarized in a certain direction, and does not transmit all other types of linearly polarized light, not by absorption or the like, but by reflection. The polarization separating film 12 transmits, in particular, linearly polarized light polarized in a first direction and totally reflects linearly polarized light polarized in a direction perpendicular to the first direction.

The polarization separating film, shown in FIG. 2, may be used, which has a multi-layered structure formed by alternately laminating two types of layers A and B. Any two adjacent layers A and B have the same refractive index in a certain direction, but different refractive indices in a direction perpendicular to the certain direction, and each of the individual layers have different thickness.

In FIG. 2, three axial directions X, Y, and Z, which are perpendicular to each other, are defined. A multi-layered structure is formed by subjecting layers A and B to, for example, extrusion molding, and stretching them in a certain direction (such as direction X), but not in direction Y when the stretching direction is in direction X. In other words, the X-axis direction corresponds to the stretching direction, whereas the Y-axis direction is oriented transversally with respect to the stretching direction. Material B has a refractive index $n_B$ (such as 1.64), which essentially does not change when stretching is performed. On the other hand, the refractive index of material A changes when stretching is performed. For example, uniaxially stretching a sheet made of material A causes it to have a refractive index $n_{AX}$ (such as 1.88) in the stretching direction (that is direction X) and a different refractive index $n_{AY}$ (such as 1.64) in a transverse direction with respect to the stretching direction (that is, direction Y). Stretching the layered structure of FIG. 2 formed of materials A and B in the direction X causes it to have a refractive index difference of $\Delta n=1.88-1.64=0.24$ in the stretching direction. On the other hand, there is no difference between the refractive indices of the A and B layers in the direction Y perpendicular to the stretching direction, since $\Delta n=1.64-1.64=0$. Since the layered structure has the aforementioned optical property, when light impinges upon the polarization separating film 12, the polarized light (a) of the incident light which is oriented in the direction of polarization axis E passes through the polarization separating film 12. On the other hand, the polarized light (b) of the incident light which is oriented in the direction of absorption axis F directly strikes a surface having a refractive index difference $\Delta n$, so that it is reflected at the surface.

Figure 3:
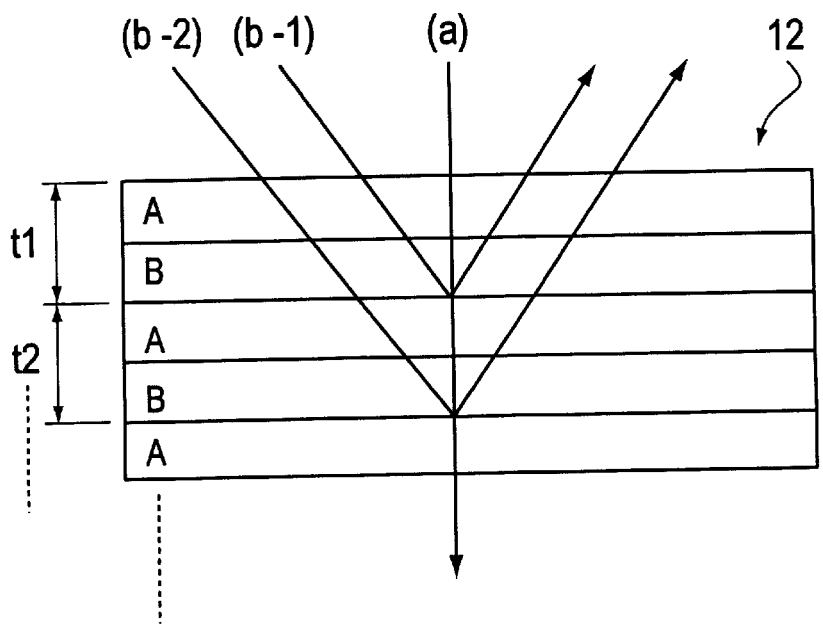
FIG. 3 is a schematic view illustrating the operation of the polarization separating film of FIG. 2.

In addition, thicknesses t1, t2, t3, . . . , of each of the layers A and B differ slightly, so that, as shown in FIG. 3, light beams of different wavelengths, (b-1), (b-2), can be reflected at the boundary surfaces between layers A and B. In other words, a multi-layered structure consisting of layers A and B with different thicknesses allows light consisting of various wavelengths to be efficiently reflected. When the thicknesses are combined in such a way as to allow reflection of all wavelengths, white light is reflected.

In the polarization separating film 12 of the present embodiment, the thickness of each layer, t1, t2, t3, etc., is set so as to reflect light of all wavelengths within the visible region (shown in FIG. 2). The surface of the polarization separating film 12 opposing the liquid crystal element 8 is a smooth surface which specularly reflects light. Optical elements, such as a light scattering plate or a light dispersing plate, are not disposed between the polarization separating film 12 and the liquid crystal element 8.

Figure 1:
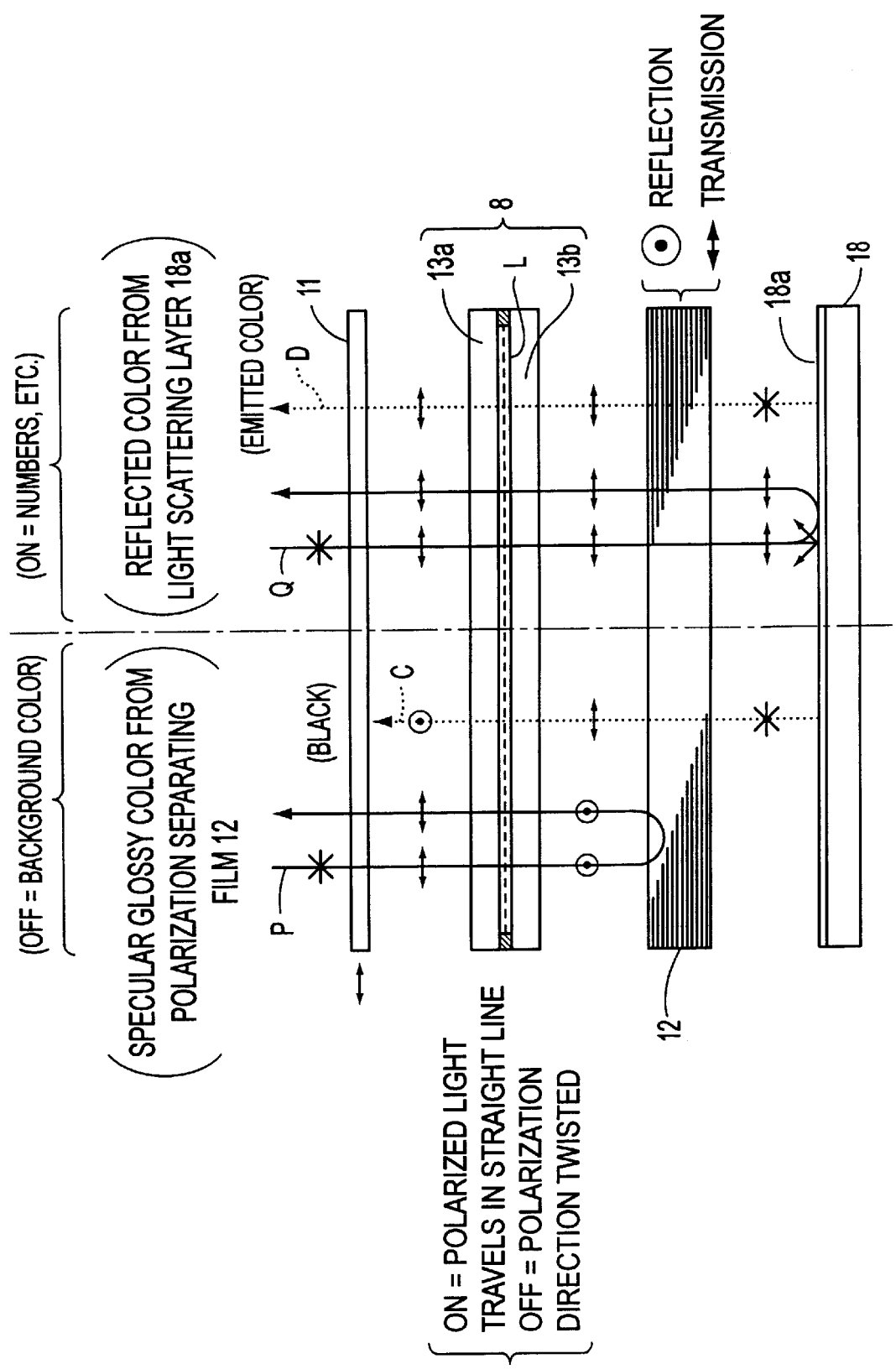
FIG. 1 is a perspective view schematically showing the main portion of an embodiment of a display device in accordance with the present invention.

The backlight 18 of FIG. 6 is composed of, for example, an electroluminescence (EL) element which is a planar light-emitting element. As shown in FIG. 1, one surface of the backlight 18 has a light scattering layer 18a for scattering light, and, in the present embodiment, is gray.

Figure 5:
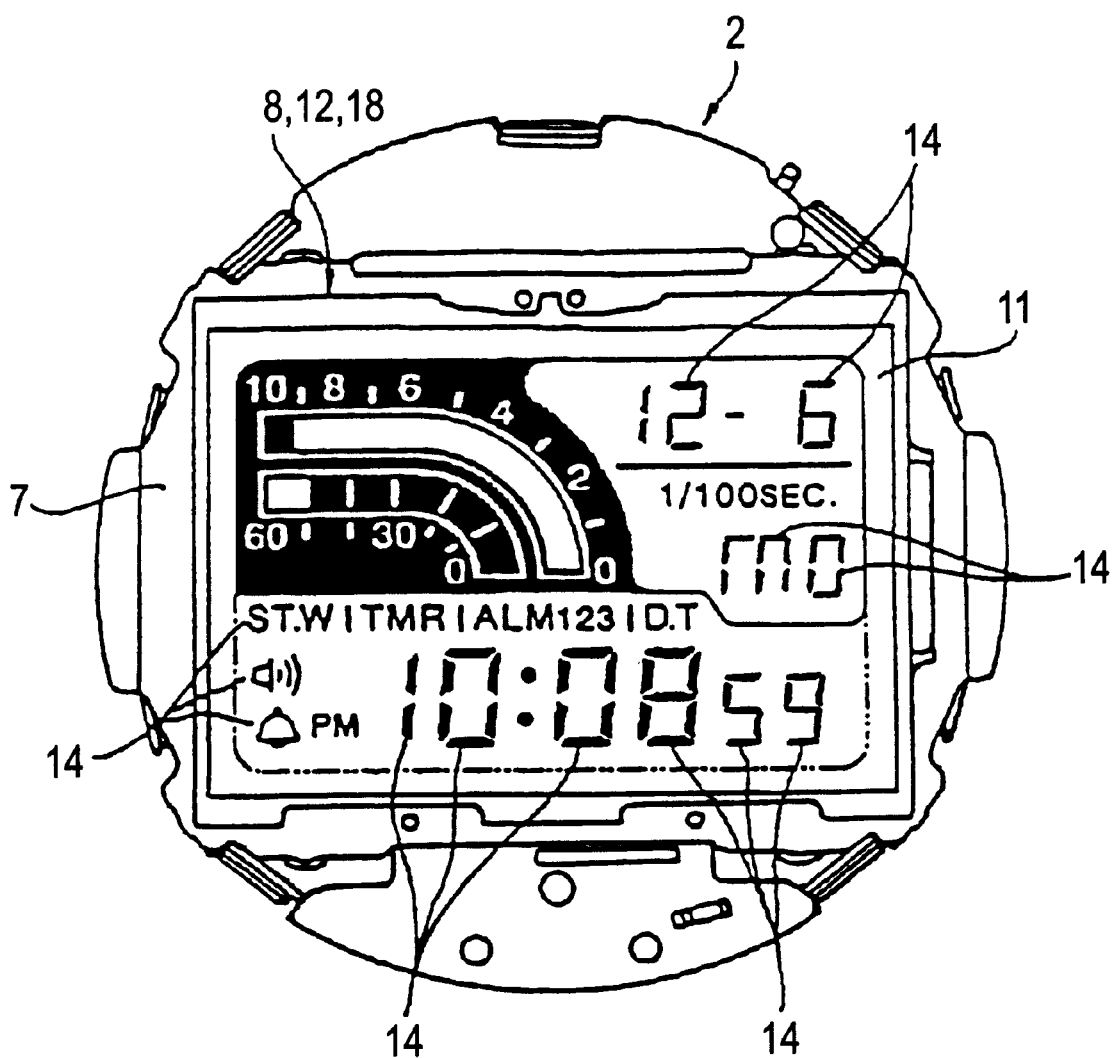
FIG. 5 is a plan view of the movement used in the electronic wristwatch of FIG. 4.

In FIG. 6, the liquid crystal element 8 comprises a pair of opposing transparent glass substrates 13a and 13b, with a so-called cell gap formed therebetween. Liquid crystal, such as a twisted nematic (TN) liquid crystal L, is filled in the cell gap. As shown in FIG. 5, a plurality of transparent electrodes 14 are formed on each of the glass substrates 13a and 13b in order to display, for example, numbers or characters. In the present embodiment, each of the transparent electrodes is divided into seven segments used for displaying one digit.

A predetermined voltage can be applied between the opposing pairs of transparent electrodes 14 formed on the pair of glass substrates 13a and 13b. The liquid crystal L is set in either of two alignment states depending on whether a voltage is applied (ON) or not applied (OFF). In the present embodiment, when the liquid crystal is set in an on state, the polarization direction of the linearly polarized light is not changed, whereas when the liquid crystal is set in an off state, the polarization direction of the linearly polarized light is twisted 90 degrees.

A description will now be given of the operation of the electronic wristwatch having the above-described structure. The wristwatch has two types of light sources, backlight 18 and external natural light. When background color of the wristwatch is to be produced, the area of the liquid crystal element 8 corresponding to the background is turned off, whereas when numerical information or the like is to be displayed, the area of the liquid crystal element 8 corresponding to where the numerical information is to be displayed is turned on. The uses of external natural light and backlight are separately described below.

When outside natural light is used, particularly for producing background color, the liquid crystal element 8 of FIG. 1 is set in an off state. Then, as indicated by arrow P in the same figure, the linearly polarized light of the external light or natural light oriented in a direction parallel to the plane of the figure passes through the polarizer 11, and its polarization direction is twisted 90 degrees by the liquid crystal element 8 set in an off state, causing the linearly polarized light to be oriented in a direction perpendicular to the plane of the figure. The linearly polarized light is reflected by the layer surfaces in the polarization separating film 12 according to wavelength. The reflected light passes successively back through the liquid crystal element 8 and the polarizer 11 for producing the background color which is perceived by the viewer.

In the present embodiment, the surface of the polarization separating film 12 opposing the liquid crystal element 8 is formed into a smooth surface which specularly reflects light. Since optical elements, such as a light-scattering plate or a light-dispersing plate, are not disposed between the polarization separating film 12 and the liquid crystal element 8, the light, reflected by the polarization separating film 12, is perceived by the viewer as a color with a glossy silver metallic tone. The background color gives the display a quality appearance.

When external natural light is to be used to display numerical information or the like, the liquid crystal element 8 is set in an on state. Then, as indicated by arrow Q, the linearly polarized light which is parallel to the plane of the figure is separated from the external light by the polarizer 11, and passes through the liquid crystal element 8. Here, the liquid crystal element 8 is in an on state, so that the polarization direction of the linearly polarized light component stays parallel to the plane of the figure. Therefore, the linearly polarized light passes through the polarization separating film 12, and is irregularly reflected by the light-scattering layer 18a at the surface of the backlight 18. Seen from the outside, this portion has a non-glossy dark color, or is gray, so that numerical information or the like is displayed in a non-glossy dark color, or gray, on a background with a glossy silver metallic tone, which is perceived by the viewer.

The linearly polarized light, which is irregularly reflected by the light-scattering layer 18a, includes light whose polarization direction shifts. This light is reflected by the polarization separating film 12 and travels back to the light-scattering layer 18a. It is repeatedly reflected until its polarization direction matches the polarization direction of the polarization separating film 12. When the directions match, the light travels upward and through the display device. In contrast to this, in the conventionally structured display device using an ordinary polarizer instead of the polarization separating film 12, the light whose polarization direction is shifted is absorbed by the polarizer, so that it does not travel upward and through the display device. In the present embodiment using the polarization separating film 12, the light reflected by the light-scattering layer 18a is efficiently led to the outside, so that a bright and easy-to-read display is provided.

As can be understood from the foregoing description, when external natural light is used, numerical information is displayed in a non-glossy gray color onto a background with a glossy silver metallic tone. Forming the light-scattering layer 18a of the backlight 18 with an appropriate color other than gray allows numerical information or the like to be displayed in any color other than gray.

When backlight 18 is used for producing, in particular, background color, the backlight 18 is turned on, and the liquid crystal element 8 is set in an off state. Then, as indicated by arrow C, the linearly polarized light oriented parallel to the plane of the figure is separated from the light or randomly polarized light emitted from the backlight 18 by the polarization separating film 12. Thereafter, the polarization direction of the linearly polarized light is twisted 90 degrees by the liquid crystal element 8 set in an off state, causing the linearly polarized light to be oriented in a direction perpendicular to the plane of the figure. The linearly polarized light, which is either absorbed or scattered by the polarizer 11, is prevented from traveling out of the display device, so that from the outside the background appears black.

When backlight 18 is to be used to display numerical information or the like, the backlight 18 is turned on and the liquid crystal element 8 is set in an on state. Then, as indicated by arrow D, the linearly polarized light oriented parallel to the plane of the figure is separated from the light of the backlight 18 by the polarization separating film 12. The linearly polarized light passes through the liquid crystal element 8 in an on state, and then through the polarizer 11, so that numerical information or the like is displayed. In the present embodiment, a gray light-scattering layer 18a is formed at the surface of the backlight 18, so that when the backlight 18 emits white light, numerical information or the like is displayed in gray.

As can be understood from the foregoing description, when, for example, it is dark so that there is not external natural light that can be made to enter the display device, the light emitted from the backlight 18 is used to display numerical information, such as time or the like, on a black background. When the backlight 18 is made to emit a red color, the information is displayed in red on a black background. Information on such displays is much easier to read than in conventional displays in which at night information is displayed in black on a white background.

In addition, such displays are suitable for use in, for example, a divers watch for giving a warning to the diver. More specifically, when it becomes necessary to give a warning to the diver as regards the water pressure or the diving time, the backlight 18 can be made to emit a color that easily attracts the human eye, such as yellow, to produce a yellow color on a black background, with such a display form being effective in warning the diver.

The backlight 18 may be made to emit light of various colors in accordance with the demands of the viewer. When the backlight 18 is made to emit orange light, red light, or yellowish green light, the displayed information can be easily read, since these colors can be easily distinguished from a black background.

The display form of an electronic timepiece using external light greatly differs from the display form of an electronic timepiece using backlight 18, so that the electronic timepiece easily attracts the attention of the viewer, making the two forms of display extremely advantageous.

The backlight 18 may be made to emit a single color from the entire surface thereof, or be made to emit as a whole multiple colors from several divided sections thereof each emitting a different color. When numerical information or the like is to be displayed using the backlight 18 set to emit multiple colors, various information can be displayed in different colors, so that multiple forms of display that meet various demands can be realized.

Figure 9:
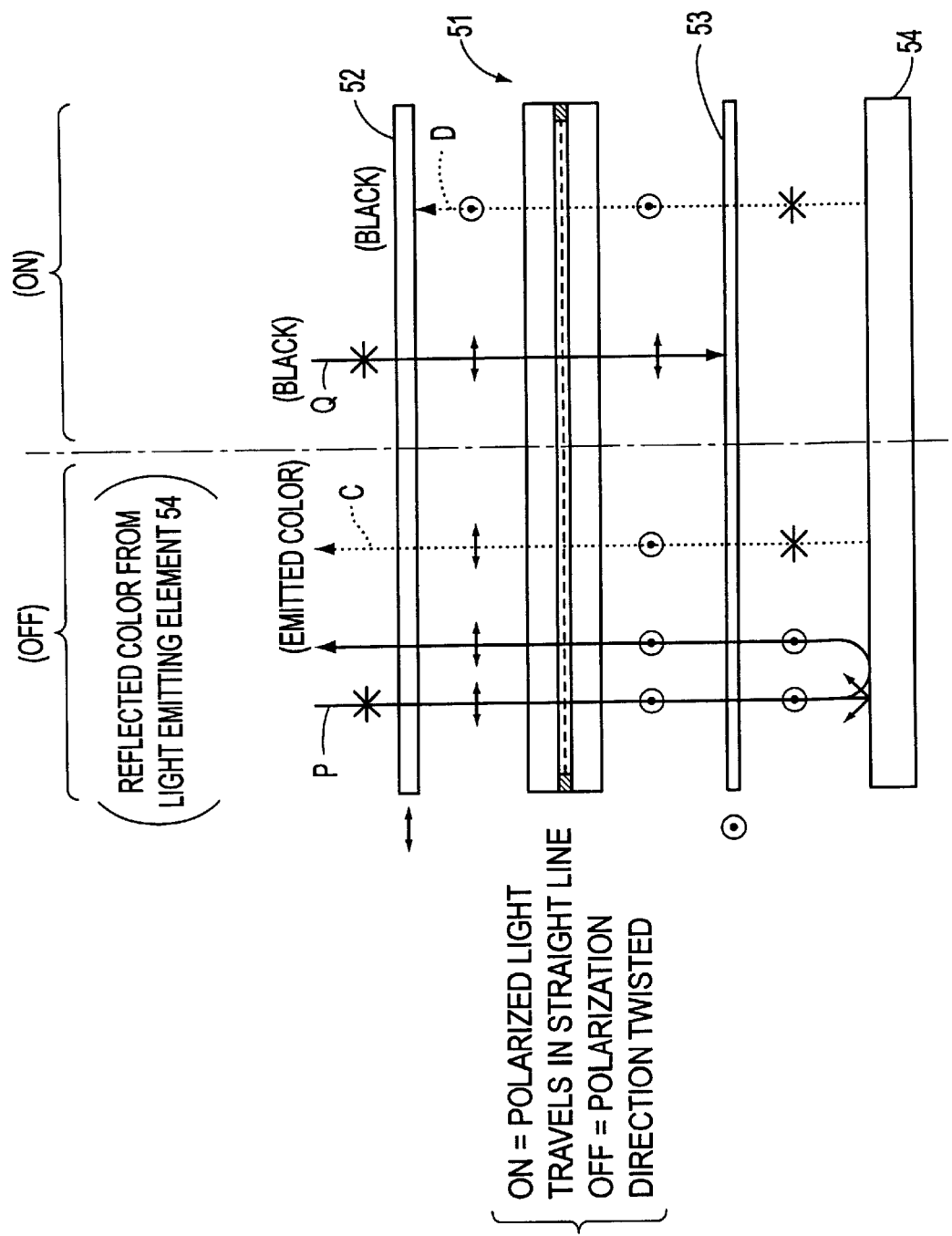
FIG. 9 is a schematic view of the main portion of a conventional display device.

In the conventional device of FIG. 9, when background color is to be produced using external light, the external light passes through the polarizer 53 twice, as indicated by arrow P. When the external light passes through the polarizer 53, the intensity of the white color of the background may be reduced, which may darken the display of the wristwatch. In the wristwatch of the present embodiment, however, as indicated by arrow P of FIG. 1, external natural light is reflected by the polarization separating film 12, and the reflected external light is used to produce the background color. Therefore, less light is absorbed by the polarizer, so that the light has high intensity, which causes the background to become bright. When background color with a glossy metallic tone, is to be produced, it is very important that the light be very intense. From this viewpoint, it is advantageous to use the structure of the present embodiment.

Figure 7:
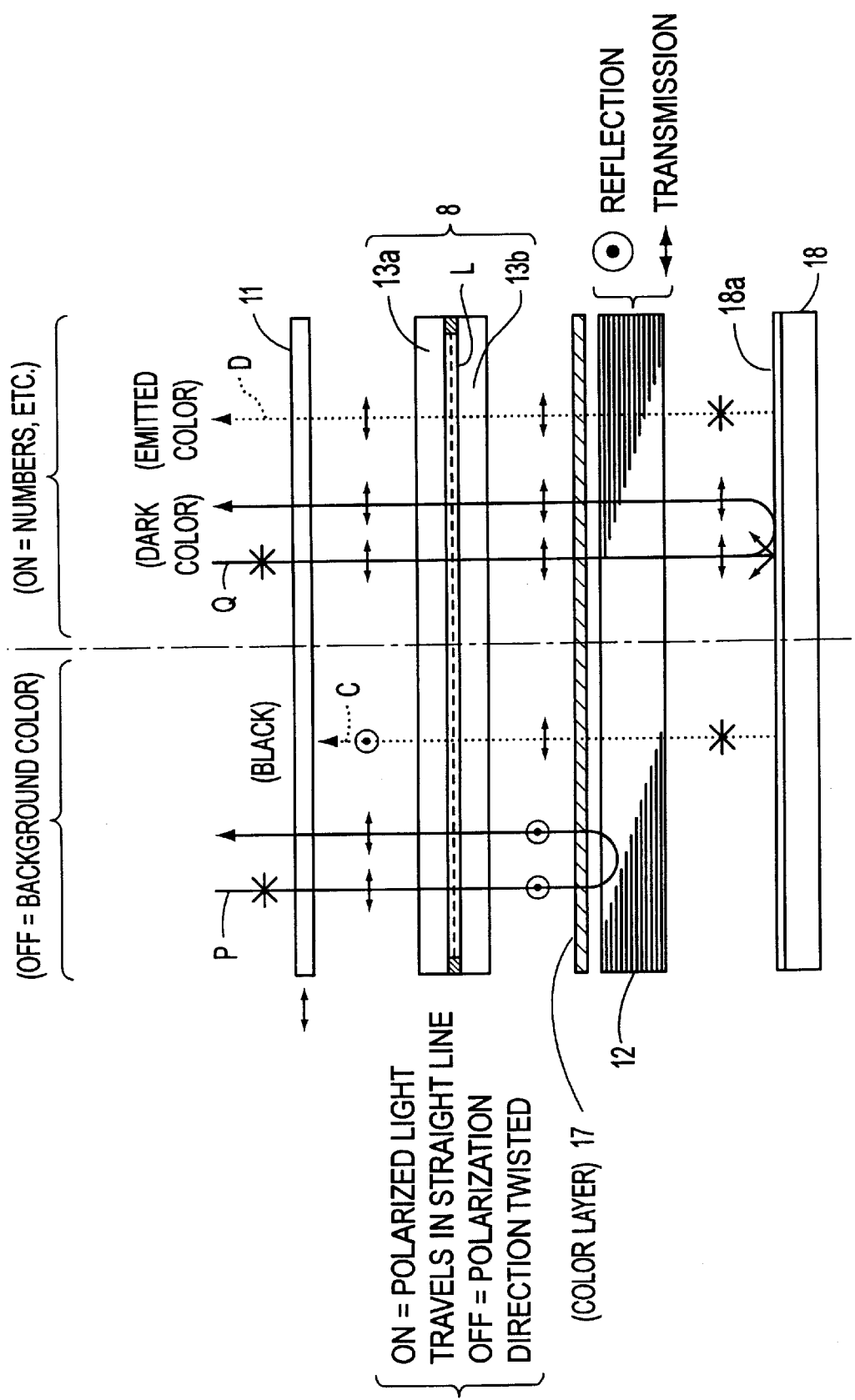
FIG. 7 is a schematic view of the main portion of another embodiment of a display device in accordance with the present invention.

FIG. 7 is a view showing the main portion of another embodiment of a display device and an electronic timepiece in accordance with the present invention. This embodiment differs from the previously described embodiment of FIG. 1 in that a transmissive color layer 17 is disposed between the liquid crystal element 8 and the polarization separating film 12. In the present embodiment, the color layer 17 can be used to produce, not only a silver display, but various other color displays with a glossy metallic tone. For example, a metallic red color display, a metallic green color display, and various other metallic color displays may be produced. When a gold layer is used as the color layer, a gold display with a glossy metallic tone can be produced. In such a case, the display is given a quality appearance.

The color layer 17 is formed, for example, by affixing an appropriate color filter to one surface of the polarization separating film 12 and/or one surface of the glass substrate 13b of the liquid crystal element 8, or by blowing fine metallic particles or other fine color particles, with a density that provides the proper translucency, onto one surface of the polarization separating film 12 and/or one surface of the glass substrate 13b of the liquid crystal element 8.

Figure 8:
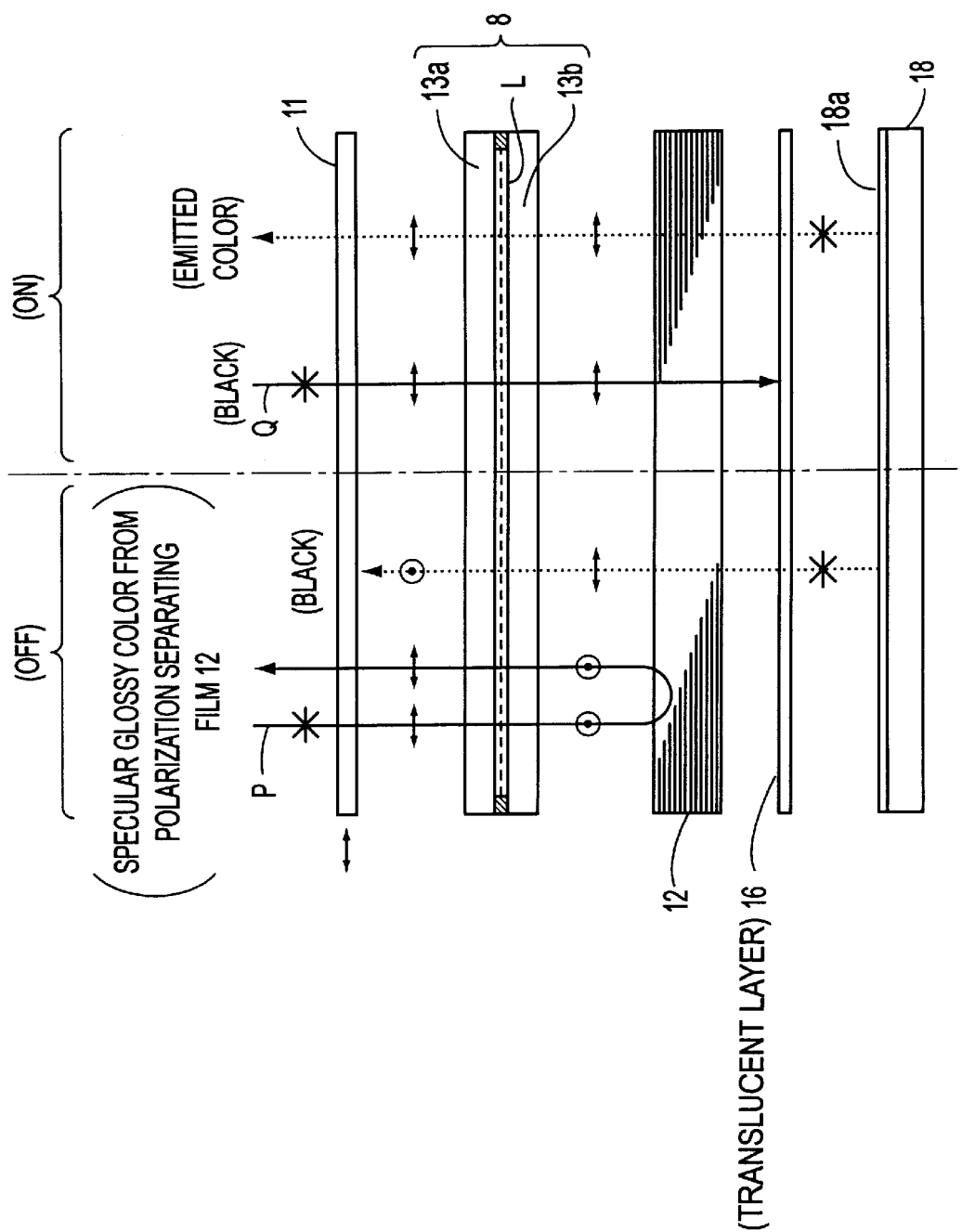
FIG. 8 is a schematic view of the main portion of still another embodiment of a display device in accordance with the present invention.

FIG. 8 is a view showing the main portion of still another embodiment of a display device and an electronic timepiece in accordance with the present invention. The present embodiment differs from the previously described embodiment of FIG. 1 in that a translucent layer 16 is disposed between the polarization separating film 12 and the backlight 18. The translucent layer 16 is formed of, for example, a gray light-absorbing material in a translucent state or a black light-absorbing material, and has a plurality of holes for transmitting light.

In the present embodiment, as indicated by arrow Q, when the liquid crystal element 8 is set in an on state in order to display numerical information or the like using external natural light, the linearly polarized light leaving the polarization separating film 12 is either absorbed or scattered by the translucent layer 16, so that the portion where absorption or scattering occurs has a vivid black color. In this case, compared to the case where numerical information or the like is displayed in a dark color, such as gray, as a result of irregularly reflecting light from one surface of the backlight 18, as indicated by the arrow Q of FIG. 1, the numerical information or the like is displayed in a vivid black color.

Although the present invention was described with reference to the preferred embodiments thereof, the present invention is not limited thereto, so that various modifications can be made. For example, although the display device was described using an electronic timepiece of FIG. 4 as an example, the present invention is applicable to various other types of display devices.

In the embodiment illustrated in FIG. 1, when external natural light is used, a glossy background color is produced by light reflected from the polarization separating film 12 and numerical information or the like is displayed in the glossy background color and in an ordinary non-glossy color that is reflected from the light-scattering layer 18a. However, for example, when the polarization direction of the polarizer 11 is shifted 90 degrees, a background with a non-glossy color can be produced by a non-glossy color coming from the light-scattering layer 18a, and numerical information or the like with a glossy color can be displayed on a non-glossy background color by light reflected from the polarization separating film 12.

In the present embodiments, the invention was described using a wristwatch.

Obviously, the present invention can be used for any other electronic timepiece having a different structure, such as a stopwatch. A light-emitting element other than an EL element may be used.

Although in the present embodiments a TN liquid crystal element was used as the polarization changing element to select either a state in which the polarization direction of the polarized light being transmitted is changed or a state in which the polarization direction of the polarized light being transmitted is not changed, an STN liquid crystal element or an ECB liquid crystal element may also be used.

In addition, although a multi-layered structure consisting of a plurality of laminated thin films, such as that shown in FIG. 2, was used as the second polarization separator which transmits linearly polarized light polarized in a certain direction and reflects linearly polarized light polarized in a direction perpendicular thereto, there may also be used, for example: 1) a polarization separating plate in which a λ/4 phase plate is provided at one or both sides of a cholesteric liquid crystal layer; 2) a polarization separator which separates polarized light by reflection and transmission by setting the angle at the Brewster's angle (refer to pp. 427 to 429 of SID 92 DIGEST); and 3) a polarization separator utilizing a hologram.

Figure 10:
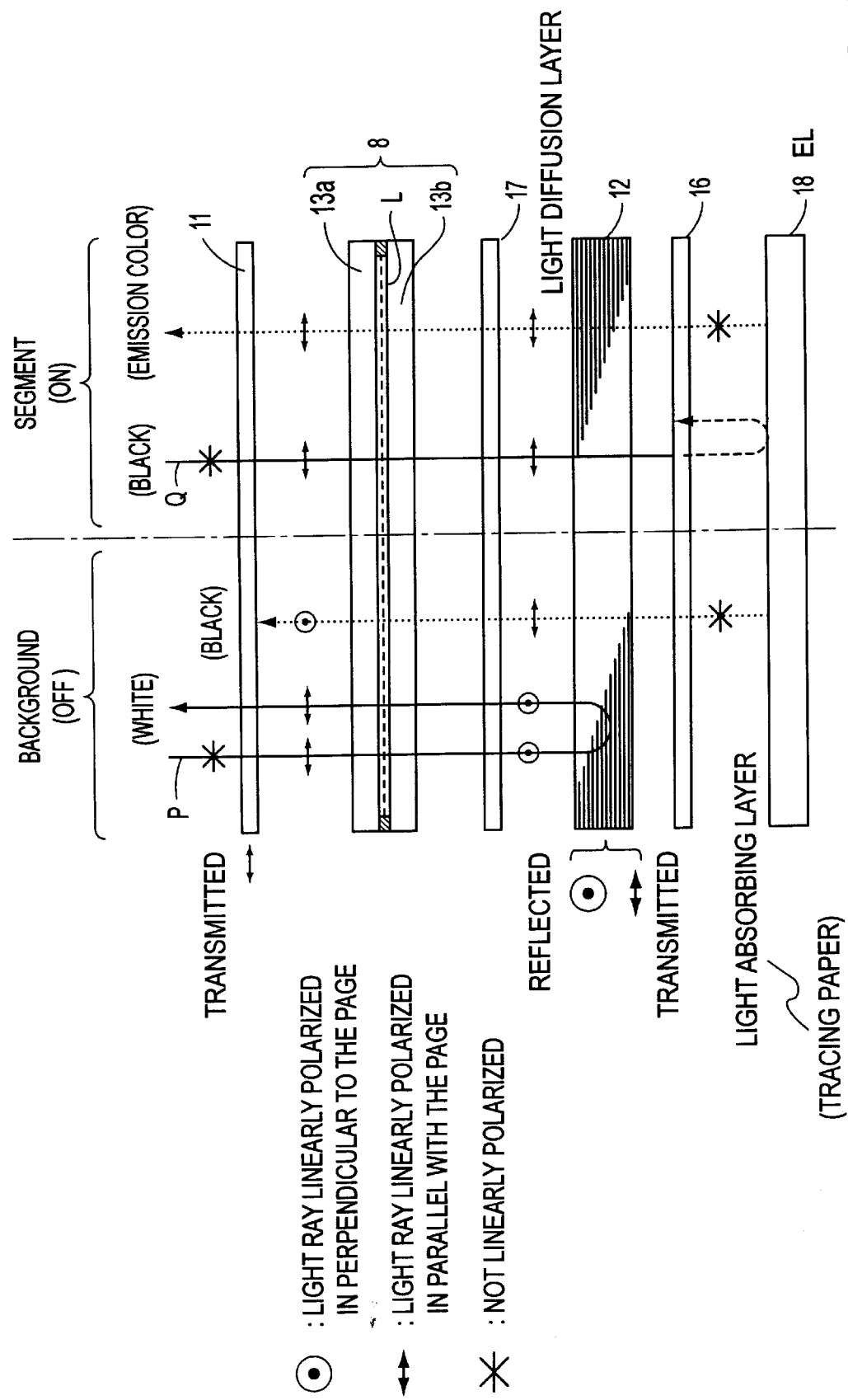
FIG. 10 is a schematic view of the main portion of alternate embodiment 1 of a display device in accordance with the present invention.

Referring to FIG. 10, a light diffusion layer 20 is substituted for the coloration layer 17 in FIG. 7, and a light absorbing layer 22 is substituted for the semi-transmissive layer 16 as the first optical element 1 shown in FIG. 8. A gray tracing paper is preferable as the light absorbing layer 22. As the light emitting element 18, a surface emitting, light green EL element may be used. As shown, the polarization direction of the polarizer 11 is arranged to be parallel with the polarization direction of the polarization separating film 12.

When the external light, as indicated by arrow P, rather than the emission of the EL element 18 is used, the light diffusion layer 20 diffuses the specular reflection light of the external light from the polarization separator 12 in a non-voltage applied area (OFF area), and makes it look white from the outside. In a voltage-applied area (ON area), the external light, as indicated by arrow Q, is transmitted through the polarization separator 12, is absorbed by the light absorbing layer 22, and even if part of it is transmitted through the light absorbing layer 22, it is irregularly reflected from the reflective surface of EL element 18, and any light reaching the light absorbing layer 22 is absorbed by the light absorbing layer 22, and practically no light exits outwardly, causing the display to look black.

When the emission of the EL element 18 is used, the polarized light is rotated by 90 degrees through the TN liquid crystal element 8, is absorbed by the polarizer 11, so that the light does not exit outwardly, and looks black, because the polarization direction of the polarization separator 12 is parallel to the polarization direction of the polarizer 11 in the non-voltage applied area (OFF area). In the voltage-applied area (ON area), the emission of the EL element 18 is transmitted through the light absorbing layer 22 because of its high energy level. Since the light absorbing layer 22 is gray, no coloration takes place, and the polarized light is transmitted through the polarization separating film 12, is not rotated in polarization by the TN liquid crystal element 8, is transmitted through the polarizer 11, and appears as the emission color (light green, for example).

Figure 11:
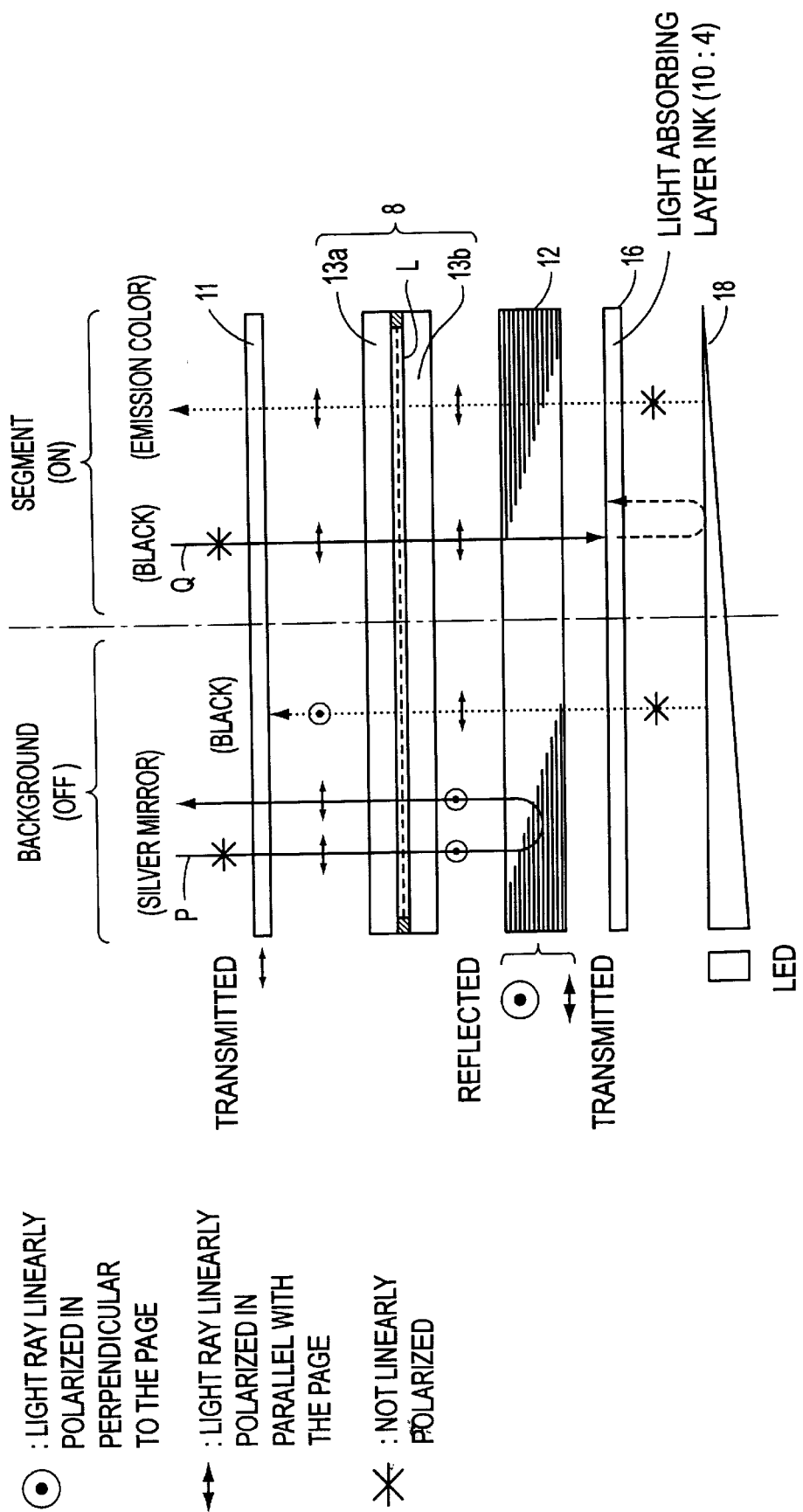
FIG. 11 is a schematic view of the main portion of alternate embodiment 2 of a display device in accordance with the present invention.

Referring to FIG. 11, a light absorbing layer 22 as a first optical element in FIG. 8 is substituted for the semi-transmissive layer 16. As the light absorbing layer 22, a black inked paper having a visible light transmittance of 60% may be used. A visible light transmittance is preferably within a range of 40% to 80%, and more preferably within a range of 55% to 65%. As the light emitting element 18, a side light red LED is arranged so that its light is guided by a light guide plate toward the light absorbing layer 22.

When the external light, as shown by arrow P, rather than the emission of the light emitting element (LED+ side light) 18 is used, the light specularly reflected by the polarization separator 12 exits as is because no light difflusion layer 17 is used, and looks silver mirror toned from the outside. In the voltage-applied area (ON area), the light, as shown by arrow Q, transmitted through the polarization separating film 12 is absorbed by the light absorbing layer 22, irregularly reflected by the reflective surface of the light emitting element 18 (LED), and further absorbed by the light absorbing layer 22, and most of the light fails to exit, looking black from the outside.

When the emission of the light emitting element 18 is used, no light exits outwardly and a black display is presented because the polarization direction of the polarization separator 12 is parallel to the polarization direction of the polarizer 11 in the non-voltage applied area (OFF area) and because the light is rotated by 90 degrees by the TN liquid crystal element 8 interposed therebetween. In the voltage-applied area (ON area), because of its high energy level, the emission is transmitted through the light absorbing layer 22 which does not color the light because of its black ink, and appears as the emission color of the light emitting element 18, for example red, from the outside.

Figure 12:
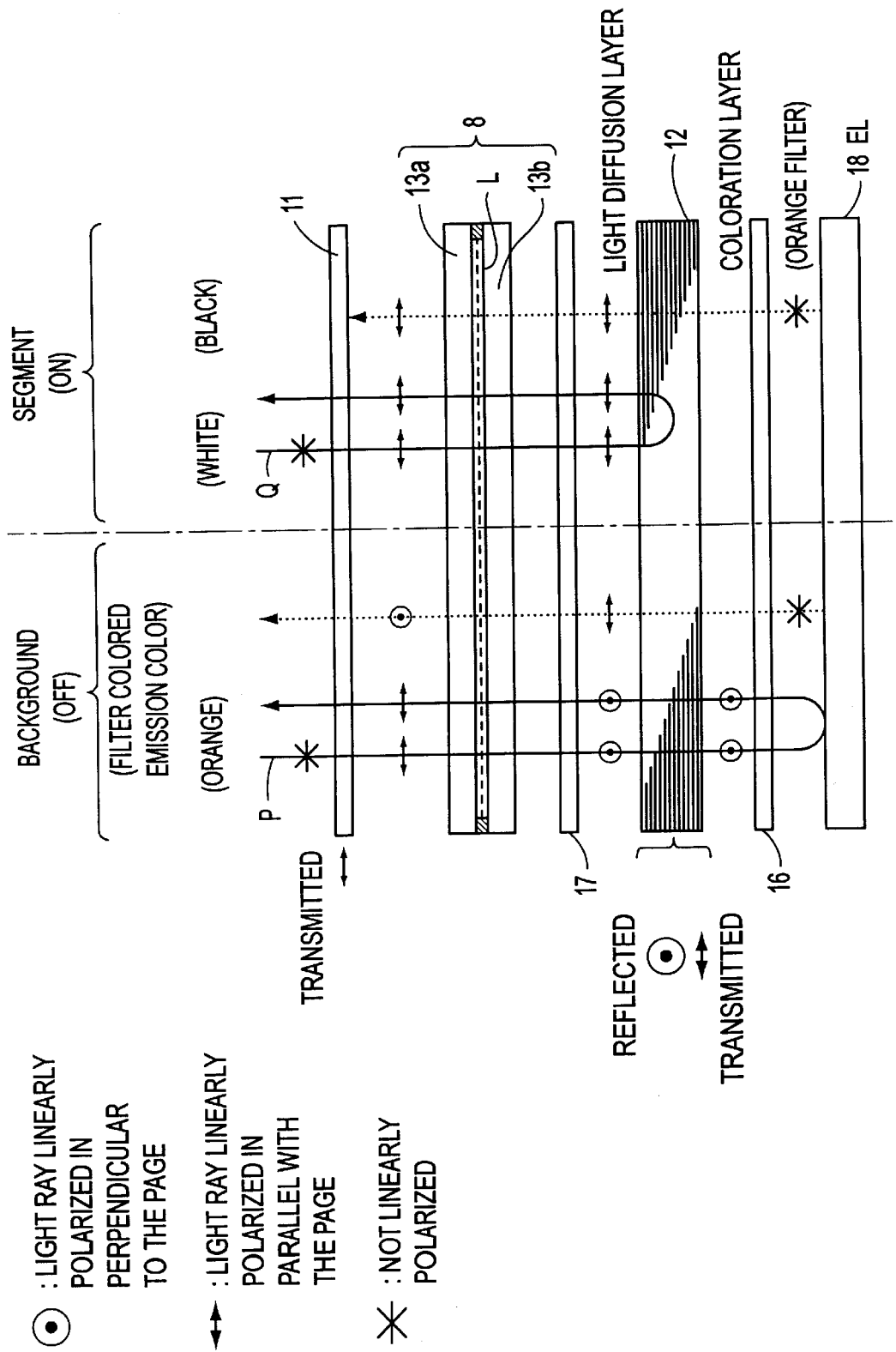
FIG. 12 is a schematic view of the main portion of alternate embodiment 3 of a display device in accordance with the present invention.

Referring to FIG. 12, a coloration layer 24 is substituted for the light absorbing layer 16 as the first optical element shown in FIG. 10. The coloration layer 24 may be a color filter, such as an orange filter, and the external light transmitted through the polarization separator 12 is colored orange. A light green, surface emitting EL element may be used as the light emitting element 18. In this embodiment, the polarization directions of the polarizer 11 and the polarization separating film 12 are mutually perpendicular.

When external light, rather than the emission of the light emitting element 18 is used, the external light, as shown by arrow P, is transmitted through the polarization separating film 12, passes twice through the coloration layer 24 as, for example, an orange filter in the non-voltage applied area (OFF area) and appears orange from the outside. In the voltage-applied area (ON area), the external light reflected from the polarization separating film 12 is diffused through the diffusion layer 20, and appears white from the outside.

When the emission of the light emitting element 18 is used, the emission of the EL element is colored through the coloration layer 24 in the non-voltage applied area (OFF area) and looks orange slightly tinted with the emission color (light green, for example). In the voltage-applied area (ON area), the emission of the EL element is not transmitted through the polarizer 11, and looks black.

Since the EL element has mild wavelength characteristics, the emission color of the EL element is light. When the emission color passes through the coloration layer 24, the color of the light transmitted through the coloration layer 24 is tinted with the coloration layer.

Figure 13:
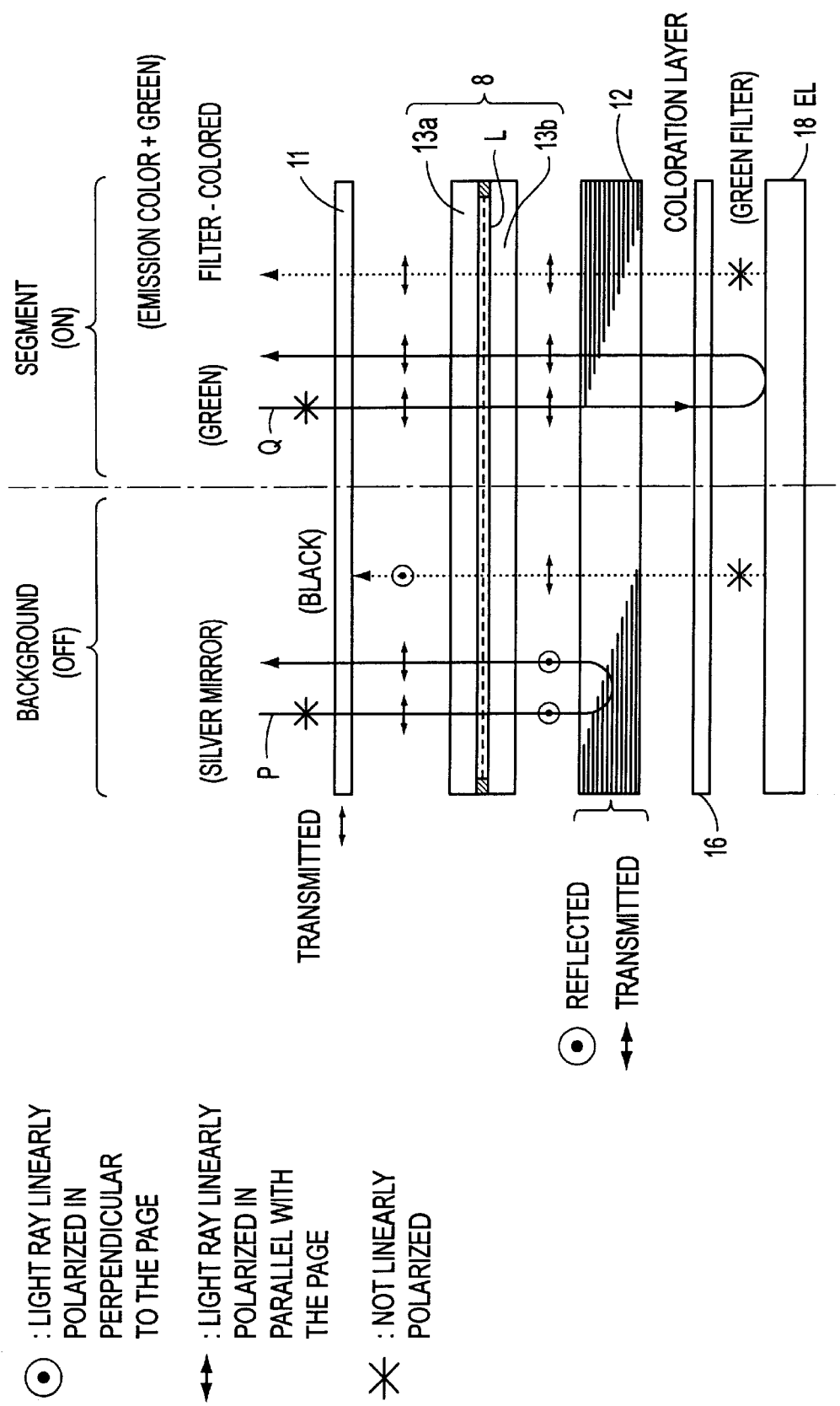
FIG. 13 is a schematic view of the main portion of alternate embodiment 4 of a display device in accordance with the present invention.

Referring to FIG. 13, the coloration layer 24 as a green filter is substituted for the light absorbing layer 16 as the first optical element shown in FIG. 11, and a surface-emitting, light green emission colored EL element may be used as the light emitting element 18.

When external light, as shown by arrow P, rather than the emission of the light emitting element 18 is used, the specularly reflected light from the polarization separating film 12 exits outward in a silver mirror tone in the non-voltage applied area (OFF area) because there is no diffusion layer 20. In the voltage applied area (ON area), the external light transmitted through the polarization separating film 12 passes through the coloration layer 24 twice to be colored green and then exits outward.

When the emission of the light emitting element 18 is used, no light exits outwardly and a black display is presented because the polarization direction of the polarization separator 12 is parallel to the polarization direction of the polarizer 11 in the non-voltage applied area (OFF area) and because the light is rotated by 90 degrees through the TN liquid crystal element 8 interposed therebetween. In the voltage-applied area (ON area), because of its high energy level, the emission is transmitted through the coloration layer 24, and looks green, for example, from the outside as a result of coloration.

Figure 14:
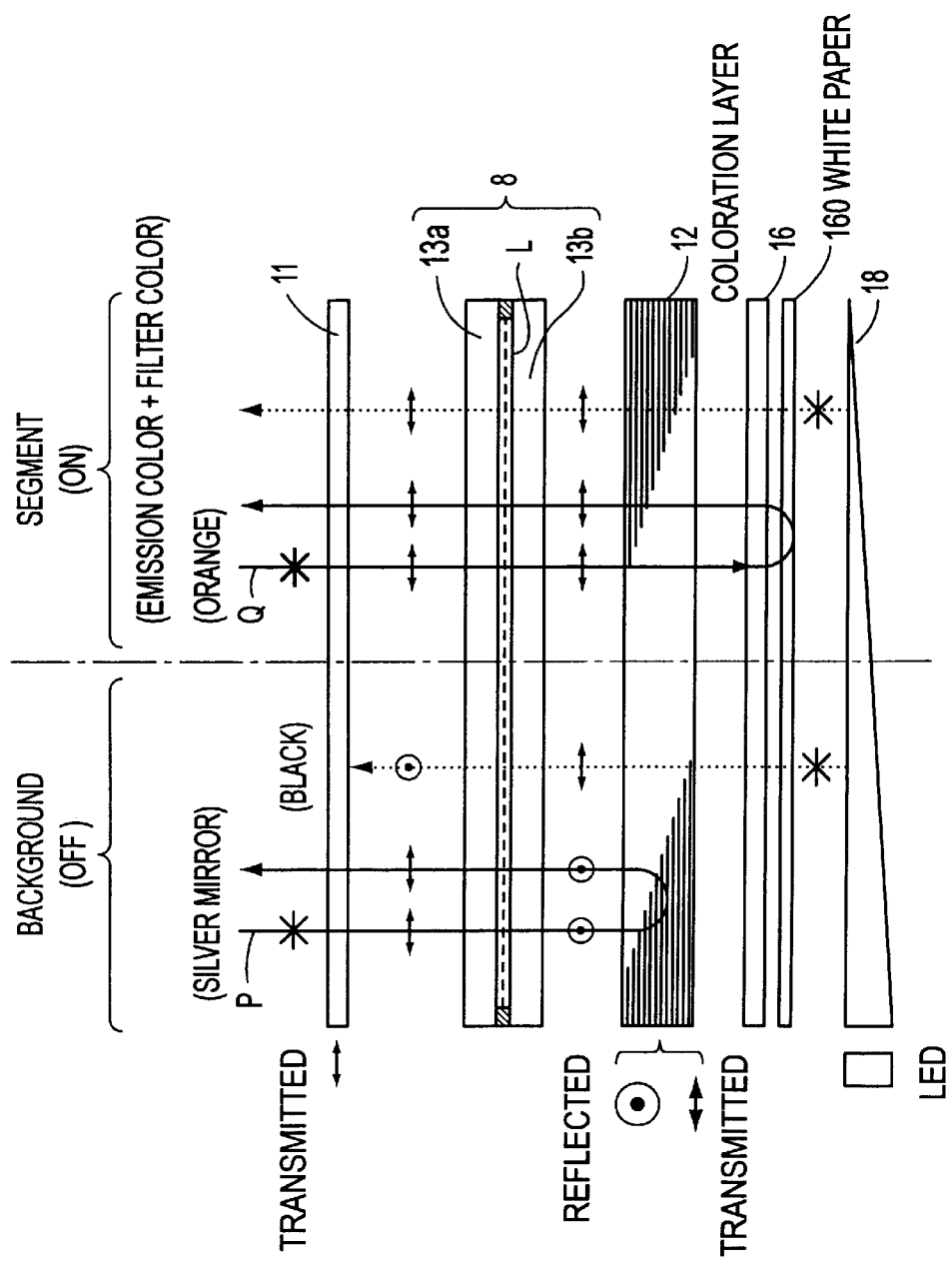
FIG. 14 is a schematic view of the main portion of alternate embodiment 5 of a display device in accordance with the present invention.

Referring to FIG. 14, a green LED device and a light guide plate as a side light type are substituted for the EL element as the light emitting element 18 shown in FIG. 13, nearer to the LED, but with the reflecting element 160 arranged on the light emitting element 18, the emission is made uniform.

The relationship of the polarization direction of the polarizer, the polarization direction of the polarization separating film and the color seen from outside the polarizer is summarized in the following table.

|  | Direction of polarization | Color with segment off (background) | Color with segment on |
|---|---|---|---|
| External light | Polarization direction of wavelength specific to color polarizer is parallel to polarization direction of polarization separating film | Surface of pol. separating film (silver mirror or white via diffusion layer) | Beneath pol. separating film (black or color of coloration layer) |
|  | Polarization direction of wavelength specific to color polarizer is perpendicular to polarization direction of polarization separating film | Beneath pol. separating film (black or color of coloration layer) | Surface of pol. separating film (silver mirror or white via diffusion layer) |
| Back light | Polarization direction of wavelength specific to color polarizer is parallel to polarization direction of polarization separating film | Black | Emission color of back light, or back light color + coloration layer |
|  | Polarization direction of wavelength specific to color polarizer is perpendicular to polarization direction of polarization separating film | Emission color of back light, or back light color + coloration layer | Black | and an orange filter may be used as the coloration layer 24 and a semi-transmissive irregularly reflective element 160 beneath it are arranged. As the semi-transmissive irregularly reflective element 160, a typical copy sheet may be used.

When the external light, rather the emission of the light emitting element 18, is used as shown by arrow P, the specularly reflected light from the polarization separating film 12 exits outward in a silver mirror tone in the non-voltage applied area (OFF area) because there is no diffusion layer 17. In the voltage applied area (ON area), the light as shown by arrow Q is transmitted through the polarization separating film 12 and passes through the coloration layer 24 twice to be colored orange, for example, and irregularly reflected by the reflective element 160, and then exits outward.

When the emission of the light emitting element 18 is used, no light exits outwardly and a black display is presented because the polarization direction of the polarization separating film 12 is parallel to the polarization direction of the polarizer 11 in the non-voltage applied area (OFF area) and because the light is rotated by 90 degrees through the TN liquid crystal element 8 interposed therebetween. In the voltage-applied area (ON area), because of its high energy level, the emission is transmitted through the reflecting element 160 and the orange filter as the coloration layer 24, and appears light orange.

The wavelength characteristics of the LED are sharp, and the emission of the LED is not efficiently transmitted through the coloration layer if it fails to match the coloration layer. The coloration layer for the LED is preferably a band pass filter (BPF) having wavelength characteristics.

The emission of the side light of the LED is not uniform in a range from a position farther from the LED to a position According to the display device and the electronic timepiece described above, a second polarization separator capable of reflecting linearly polarized light other than that having a predetermined polarization direction may be used, so that light, which in conventional devices is either absorbed or scattered, is reflected, and the reflected light is used for the display. As a result, the background color and such information as numerical information appear considerably brighter.

In addition, a surface of the second polarization separator may be formed into a smooth surface which specularly reflects light, so that a background and information (such as numerical information) display with a silver metallic tone can be produced, giving the display a quality appearance. When the intensity of the light reflected by the second polarization separator is low, the desired glossy color cannot be obtained, but using the second polarization separator capable of reflecting linearly polarized light other than that having a predetermined polarization direction allows a highly intense light to be reflected, thereby providing the desired glossy color.

According to the electronic timepiece, a transmissive color layer may be provided to allow various colors, other than silver, with a glossy metallic tone to be produced. In particular, using a gold color layer allows a glossy gold metallic tone to be realized, which gives the display a quality appearance.

According to the electronic timepiece, a light-scattering layer may be provided at the back side of the second polarization separator with respect to the viewer to allow the area other than the display area with a glossy metallic color to have a non-glossy color, so that the background color area and the information display area can be definitely distinguished from each other.

According to the electronic timepiece, a light emitting element may be provided as an additional structural element to allow the viewer to freely select the method of display, that is either the display method using external light or that using a light emitting element. In addition, compared to conventional electronic timepieces which utilize two polarizers for displaying information, electronic timepieces using the second polarization separator which transmits linearly polarized light oriented in a certain direction and reflects all other linearly polarized light allow the background color and the form of display of such information as numerical information to be considerably different, when the display methods are switched between that using external natural light and that using the light emitting element. Such a change may surprise the viewer.

According to the electronic timepiece, orange or other such colors may be used that stand out against black, so that numerical information or the like displayed in such colors is bright and thus easy to read, easily attracting the human eye. Thus, in the display of one electronic timepiece, numerical information or the like can be displayed in several colors and several background colors can be produced, so that various types of displays can be realized.

According to the electronic timepiece, even when a common light source that Venerates white light is used, various colors can be produced by the use of a light emitting element.

Further, a polarization separating film having a laminated structure of a plurality of thin films may be used as the second polarization separator. The polarization separating film having this structure is extremely thin and flexible, so that the electronic timepiece as a whole can be made thin, and the manufacturing process can be simplified.

What is claimed is:

1. A display device, comprising:
   a first polarization separator that transmits therethrough linearly polarized light polarized in a first direction and that does not transmit therethrough linearly polarized light polarized in a direction perpendicular to the first direction;
   a polarization changing element, disposed at a position to receive the linearly polarized light from said first polarization separator, that selects between a state in which a polarization direction of light transmitted therethrough is changed and a state in which the polarization direction is not changed;
   a second polarization separator, diametrically opposed to said first polarization separator with said polarization changing element interposed therebetween, that transmits linearly polarized light polarized in the first direction and reflects linearly polarized light polarized in a direction perpendicular to said first direction, the surface of said second polarization separator facing said polarization changing element being a smooth surface that reflects light in specular reflection;
   a first optical element;
   a light scattering layer laminated on the first optical element; and
   a light emitting element laminated on the light scattering layer, the light scattering layer scattering light on a surface of the light emitting element.

2. A timepiece, comprising:
   a first polarization separator that transmits therethrough linearly polarized light polarized in a first direction and that does not transmit therethrough linearly polarized light polarized in a direction perpendicular to said first direction;
   a polarization changing element, disposed at a position to receive the linearly polarized light from said first polarization separator, that selects between a state in which a polarization direction is changed and a state in which the polarization direction is not changed;
   a second polarization separator, diametrically opposed to said first polarization separator with said polarization changing element interposed therebetween, that transmits linearly polarized light polarized in the first direction, and reflects linearly polarized light polarized in a direction perpendicular to said first direction;
   a first optical element;
   a light scattering layer laminated on the first optical element; and
   a light emitting element laminated on the light scattering layer, the light scattering layer scattering light on a surface of the light emitting element,
   the light emitting element being arranged on a side of said second polarization separator opposite to said polarization changing element.

3. A timepiece, comprising a lamination of
   a first polarizer that transmits linearly polarized light polarized in a first direction and that does not transmit linearly polarized light polarized in a second direction perpendicular to said first direction;
   a twisted nematic liquid crystal layer that rotates a polarization direction of light passing therethrough in an off state and that does not rotate the polarization direction in an on state;
   a second polarizer that transmits linearly polarized light polarized in a third direction and that reflects, in specular reflection, linearly polarized light polarized in a fourth direction perpendicular to said third direction;
   a first optical element;
   a light scattering layer laminated on the first optical element, and
   a light emitting element laminated on the light scattering layer, the light scattering layer scattering light on a surface of the light emitting element.

4. The timepiece according to claim 3, said light scattering layer irregularly reflects light traveling from said second polarizer to said light emitting element.

5. The timepiece according to claim 4, said first optical element a light absorbing layer.

6. The timepiece according to claim 4, said first optical element being a coloration layer.

7. The timepiece according to claim 5, further comprising a second optical element between said twisted nematic liquid crystal layer and said second polarizer.

8. The timepiece according to claim 7, said second element being either a light diffusion layer or a light scattering layer.

9. The timepiece according to claim 6, further comprising a second optical element between said twisted nematic liquid crystal layer and said second polarizer.

10. The timepiece according to claim 9, said second optical element being either a light diffusion layer or a light scattering layer.

11. The timepiece according to claim 8, said light absorbing layer being a tracing paper.

12. The timepiece according to claim 5, said light absorbing layer having a visible light transmittance within a range of from 40% to 80%.

13. The timepiece according to claim 12, said light absorbing layer having a visible light transmittance within a range of from 55% to 65%.

14. The timepiece according to claim 6, further comprising an element arranged between said coloration layer and said light scattering layer that transmits light from said light emitting element while irregularly reflecting light from said coloration layer.

15. The timepiece according to claim 11, said light emitting element comprising an electroluminescence element.

16. The timepiece according to claim 13, said light emitting element comprising a light emitting diode.

17. The timepiece according to claim 10, said light emitting element comprising an electroluminescence element.

18. The timepiece according to claim 6, said light emitting element comprising an electroluminescence element.

19. The timepiece according to claim 14, said light emitting element comprising a light emitting diode.

20. The timepiece according to claim 2, further comprising a light-transmissive color layer between said polarization changing element and said light emitting element.

21. The timepiece according to claim 3, said light emitting element comprising an electroluminescence element or a light emitting diode that emits light of at least one of orange light, red light, light green light, and green light to said twisted nematic liquid crystal layer via said second polarizer.

22. A timepiece, comprising a lamination of:
- a first polarizer that transmits polarized light polarized in a direction parallel to a first polarization direction while absorbing polarized light polarized in a direction perpendicular to said first polarization direction;
- a liquid crystal layer that rotates the polarization direction of incident light by 90 degrees in a non-voltage applied state and that does not rotate the polarization direction of the incident light in a voltage-applied state;
- a polarization separator that transmits polarized light polarized in a second polarization direction and that reflects polarized light polarized in a direction perpendicular to said second polarization direction;
- a first optical element;
- a light scattering element; and
- a light emitting element that emits an emission color light, laminated in the above order, the light scattering element scattering light on a surface of the light emitting element, when said first polarization direction is parallel to said second polarization direction, a first color light from external light in the non-voltage applied state has a color of the light reflected from said polarization separator while a second color light from the external light in the voltage-applied state has a color of the light transmitted through said first optical element;

when said first polarization direction is parallel to said second polarization direction, a third color light from the emission of said light emitting element in the non-voltage applied state is black while a fourth color light from the emission of said light emitting element in the voltage-applied state has the color of the light transmitted through said first optical element;

when said first polarization direction is perpendicular to said second polarization direction, a fifth color light from the external light in the non-voltage applied state has the color of the light transmitted through said first optical element while a sixth color light from the external light in the voltage-applied state has the color of the light reflected from said polarization separator; and when said first polarization direction is perpendicular to said second polarization direction, a seventh color light from the emission of said light emitting element in the non-voltage applied state has the color of the light transmitted through said first optical element while an eighth color light from the emission of said light emitting element in the voltage applied state is black.

23. The timepiece according to claim 22, further comprising one of a light scattering layer or a light diffusion layer between said liquid crystal layer and said polarization separator, wherein both said first color light and said sixth color light are white.

24. The timepiece according to claim 22, said first optical element being a light absorbing layer;
- both said second color light and said fifth color light being black; and
- both said fourth color light and said seventh color light have the emission color.

25. The timepiece according to claim 22, said first optical element being a coloration layer;
- both said second color light and said fifth color light being a color of said coloration layer; and
- both said fourth color light and said seventh color light have the emission color that is colored through transmission through said coloration layer.

* * * * *